April 21, 1959  R. N. KNOSP ET AL  2,882,761
RADIAL DRILL SPINDLE FEED Filed July 26, 1956  4 Sheets-Sheet 1

INVENTORS.
Robert N. Knosp.
BY Carl E. Linden.
Frank O. Wetzel.
Wood, Herron & Evans.
ATTORNEYS.

April 21, 1959 R. N. KNOSP ET AL 2,882,761
RADIAL DRILL SPINDLE FEED
Filed July 26, 1956 4 Sheets-Sheet 2

INVENTORS.
Robert N. Knosp.
BY Carl E. Linden.
Frank O. Wetzel.
Wood, Herron & Evans,
ATTORNEYS.

April 21, 1959  R. N. KNOSP ET AL  2,882,761
RADIAL DRILL SPINDLE FEED
Filed July 26, 1956  4 Sheets-Sheet 3

INVENTORS.
Robert N. Knosp.
BY Carl E. Linden
Frank O. Wetzel.
Word, Herron & Evans,
ATTORNEYS.

April 21, 1959 R. N. KNOSP ET AL 2,882,761
RADIAL DRILL SPINDLE FEED

Filed July 26, 1956 4 Sheets-Sheet 4

INVENTORS.
Robert N. Knosp.
BY Carl E. Linden.
Frank O. Wetzel.
Wood, Herron & Evans.
ATTORNEYS.

United States Patent Office 2,882,761
Patented Apr. 21, 1959

2,882,761

RADIAL DRILL SPINDLE FEED

Robert N. Knosp, Ludlow, Ky., and Carl E. Linden, Cincinnati, and Frank O. Wetzel, Norwood, Ohio, assignors, by mesne assignments, to The Fosdick Machine Tool Company, Cincinnati, Ohio, a corporation of Ohio Application July 26, 1956, Serial No. 600,275

19 Claims. (Cl. 77—28)

This invention relates to radial drills and is directed particularly to improvements in the structure and arrangement of the spindle feeding mechanism whereby the possibilities of introducing errors in the spindle setting in consequence of spindle power feed engagement are substantially reduced.

In the operation of a typical radial drilling machine of the type wherein the arm is movable arcuately over the work piece and the head is slideable upon the arm, it is necessary for the operator to actuate the spindle toward or from the work piece by manipulating one or both of the feed horns or levers which project angularly from the face of the head. In typical constructions which have been conventional for many years, the horns or levers project outwardly from a rotatable feed shaft, and therefore may be swung in a vertical plane parallel to the arm to advance or retract the spindle manually. In addition, however, such machines conventionally include a power feed clutch engaged by axial movement of the feed shaft, for this purpose, the horns or levers are mounted pivotally at their inner extremities so as to move the shaft longitudinally when either or both of the feed levers are pulled outwardly toward the operator in a direction away from the head. In a typical drilling operation, the feed levers are swung manually to lower the spindle and bring the point of a drill socketed therein to a level just above the work piece, the main arm is swung arcuately about the column over the work and the head is moved along on the arm to center the drill precisely over the point at which a hole is to be drilled, then the feed levers are pulled toward the operator to engage the feed clutch. With the spindle in rotation, the drill then advances under power toward and into the work piece for the drilling operation.

The components of a modern radial drill of even the largest size are balanced nicely to permit free and even movement of the arm about the column and the head upon the arm. As a result, a competent operator is able to position the drill spindle rapidly over the point at which a hole is to be drilled, and a setting of considerable accuracy is readily obtained with little manual effort. If the hole is of substantial diameter, the arm and head of a machine may be clamped in the position in which they have been set so that forces encountered during drilling, especially at the start of cutting, will not disturb the predetermined relationship, but if the holes to be drilled are of nominal diameter only, then the operator may forego the clamping operation and rely only upon the inertia of the head and arm to resist disturbance of the spindle setting during actual drilling. However, even in those machines, which are equipped with power-operated clamps, it is conventional to cause the clamps to become actuated in consequence of movement of the feed levers or horns toward feed-clutch engaging position, the usual arrangement being such that the clamps become energized just prior to completion of the clutch-engaging movement of the horns.

In operation of a radial drill, it has been found that actuation of the feed clutch levers to engage the power feed inadvertently but on frequent occasions causes the arm to move slightly from the position in which it previously has been set. When this occurs, the care and attention which the operator may previously have devoted to in accurately positioning the spindle is lost and the holes will be drilled on an axis other than the one desired. Usually the error is not large, say from only a few thousandths of an inch to less than ½₂ of an inch or so, but the introduction of the error inherently defeats the accuracy of which the machine is otherwise capable.

To eliminate time loss in spindle setting, it is obviously desirable for the operator to be able to move the arm smoothly without exerting great manual effort. On the other hand, being movable without much resistance, the arm is likely to shift from a selected position when force of generally horizontal direction is applied against it such as occurs in pulling either one of the feed levers to feed position. The problem, therefore, cannot be ascribed to operator carelessness but becomes more acute the higher the production rate the operator seeks to obtain.

A principal objective of this invention has been to provide for a radial drill, a power feed mechanism having the outward characteristics of conventional feed lever constructions with which radial drill operators are well acquainted, but having a spindle feed system so arranged as to prevent inadvertent disturbance of the setting of the spindle over the work piece incident to feed clutch engagement.

More specifically, an objective of the invention has been to provide an improved feed clutch system for a radial drill whereby feed clutch engagement is effected by means of a feed clutch control element which is actuated in a vertical or substantially vertical plane whereby the possibility of inadvertently displacing the spindle through the application of horizontally directed clutch control forces is eliminated and whereby the certainty with which the machinist may operate the machine is improved and the output is increased.

A further objective of the present invention has been to provide a power feed clutch for a radial drill which is more convenient for the operator to use and which requires less exertion of manual effort as well as less attention on the operator's part than past devices.

A further objective of the invention is to provide a radial drill having a power feed system emboding a magnetic clutch which is subject to control from one or more switches conveniently located in or on either one or both of the feed horns of the machine, and to provide a control system for depolarizing the magnetic clutch upon de-energization of the same to avoid feed overtravel.

One embodiment of a radial drill embodying the foregoing principles of the invention is illustrated in the accompanying drawings in which.

Figure 1:
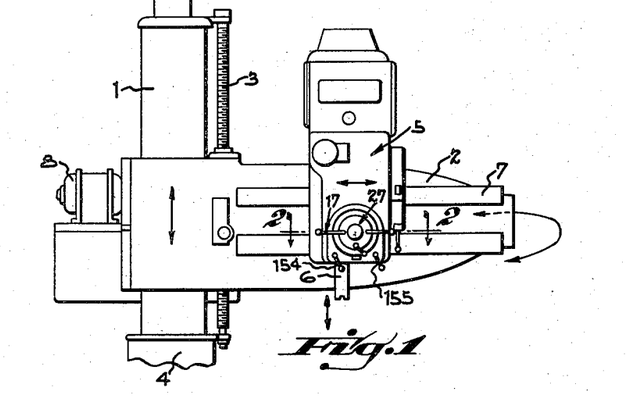
Figure 1 is a front elevation of a radial drill showing the column, arm, head, and spindle. The base, residing beneath the head, is omitted.

The conventional radial drill structure illustrated in Figure 1 comprises a column 1 and an arm 2 which is movable vertically upon the column by means of an elevating screw 3. The column is rotatable about a stump which extends rigidly from a floor base (not shown) upon which a work piece to be drilled is mounted. A head 5, carrying a rotatable drill spindle 6, is slideable horizontally along the ways 7 of arm 2, and a motor 8, mounted on the arm, furnishes power through a main drive shaft to an internal gear train (not shown) in the head for rotating the spindle. At its lower end, spindle 6 is equipped with a socket or other suitable means for receiving a drill, reamer, boring tool or other cutters through which a work piece may be machined. The movements of the arm, head, and spindle, are indicated by the arrows in Figure 1.

As is usual, the spindle is mounted rotatably in a quill 9 (Figure 2) which, in turn, is movable axially in the head. The quill is provided with chordal rack teeth which are engaged by a feed pinion 12 fixed upon a rotatable feed shaft 13. The head carries internal feed gearing indicated generally at 15 and a clutch indicated generally at 16, for coupling the feed shaft 13 therewith. In addition, the feed shaft, at the exterior of the head 5 carries one or more feed horns or levers indicated generally at 17 through which the feed shaft 13 may be moved manually, or through which the clutch 16 may be engaged for power feed. These elements and the manner in which they are combined and controlled and operated constitute the subject matter of this invention.

Figure 2:
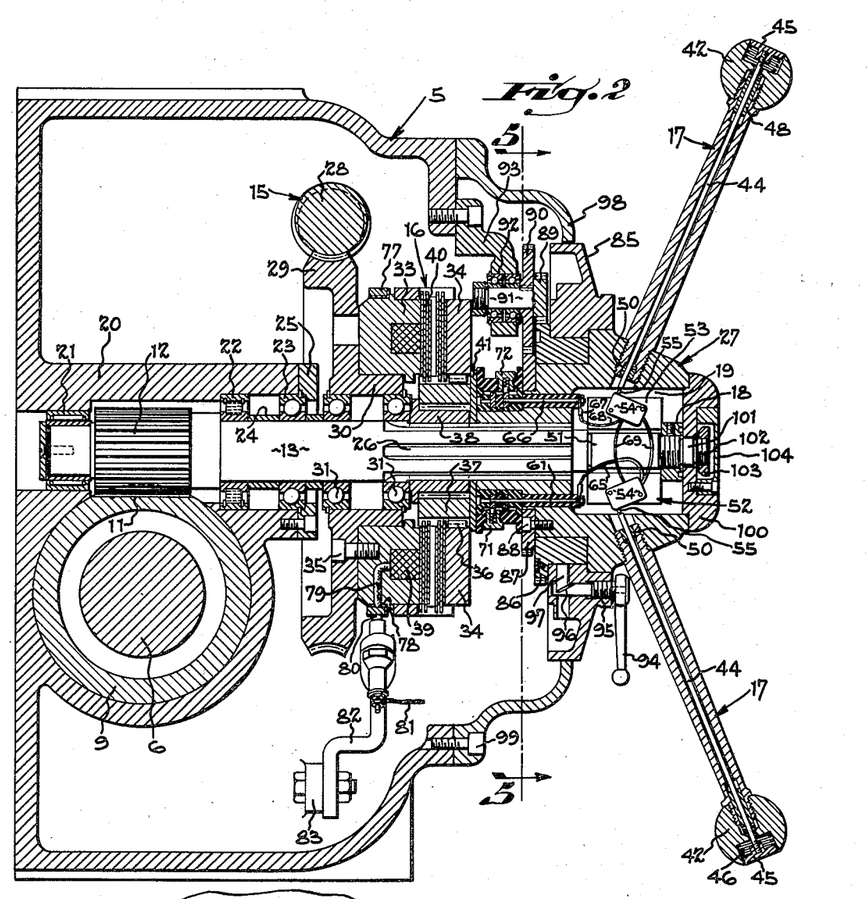
Figure 2 is an enlarged cross-sectional view through the feed section of the head as taken on the line 2—2 of Figure 1.

In the embodiment illustrated, the head 5 of the machine is provided with an internal boss 20, which is bored horizontally to receive an anti-friction bearing 21 for rotatably supporting the rear end of the feed shaft 13. Anti-friction bearings 22 and 23, which are spaced by ring 24, are mounted in the boss 20 at the forward side of pinion 12 to support a forward portion of the feed shaft 13. The rearward bearing 21 abuts a shoulder on the feed shaft while the forward bearing is engaged by a cap 25 secured by screws to the end face of the boss 20. The feed shaft projects forwardly beyond this area where it is splined as at 26. A hub, indicated generally at 27, is keyed on the splined portion of the feed shaft so as to be in driving connection therewith at the front face of the head 5. The feed horns or levers 17 project radially from this hub.

From the foregoing, it will be seen that the operator may grasp either horn 17 to swing the same through a vertical plane and thereby rotate the feed shaft to cause pinion 12 to raise or lower the quill 9 for adjusting the level of spindle 6 with respect to the work piece. For major adjustment of the spindle elevation, the main arm 2 of the machine may be raised or lowered on the column 1 by means of the elevating screws 3 in the usual manner.

The power feed gearing 15 comprises a worm 28 rotatably mounted in the head 5 and meshing with a worm wheel 29. The worm 28 may be driven either from the spindle speed gearing in the conventional way or driven by other suitable means. The worm wheel includes a hub 30 journalled on feed shaft 13 by anti-friction bearings 31 which are spaced apart from one another.

Clutch 16, previously indicated, is an electro-magnetic clutch of the direct current type comprising a driver member 33 and a driven member 34, the driver 33 being fixed to the worm wheel 29. The driven member 34 is connected to the splined portion 26 of the feed shaft 13, such that the feed shaft is driven from the feed gearing 15 when the clutch members 33 and 34 are in frictional engagement with one another. In the construction shown, the clutch driver member 33 is mounted on a counterturned portion of the worm wheel hub 30 and is fixed thereto by fastening screws 35. Driven member 34 is in the form of a round plate having central internal coupling teeth 36. These teeth mesh with teeth cut upon the periphery of a coupling ring 37 which, in turn, has internal teeth meshing with external teeth of an inner coupling ring 38 which is splined upon feed shaft 13.

At the forward face of clutch driver 33, an annular magnetic winding 39, is disposed, and a plurality of friction clutch plates 40 are disposed intermediate the faces of the driver and driven clutch members.

In the use of a radial drill, prompt disengagement of a feed clutch frequently is requisite, otherwise a work piece may be spoiled through over-travel of the spindle. However, the field flux of a magnetic-type clutch, which is used in the environment of members that have to be made of steel or other magnetically responsive material to sustain the loads to which they are subjected, may magnetize such members to such a degree that the residual magnetism thereof will interfere with prompt clutch release. The present invention contemplates two features through which this undesirable effect is avoided; first, by the shielding of ferrous metal parts of the clutch system; second, as is described at a later point, by a reversal of polarity of the clutch winding to depolarize the same and thereby space the driver and the driven members through magnetic repulsion.

As to the first feature, worm wheel 29 is made of bronze or other non-magnetic material, and also, the intermediate coupling ring 37 which is engaged by the clutch driven member 34. The clutch driven member 34 is made of hardened steel as is the inner coupling ring 38 engaging feed shaft 13. Thus, the internal teeth 36 of member 34 permits it to move axially of the feed shaft 13 under magnetic attraction when the winding 39 is energized. The feed shaft and adjacent ferrous metal parts are at least partially shielded to prevent residual magnetism from interfering with their release upon de-energization of the magnetic winding. The rearward end of hub 27 abut a bronze washer 41 which holds the intermediate ring 37 against longitudinal movement.

Figure 4:
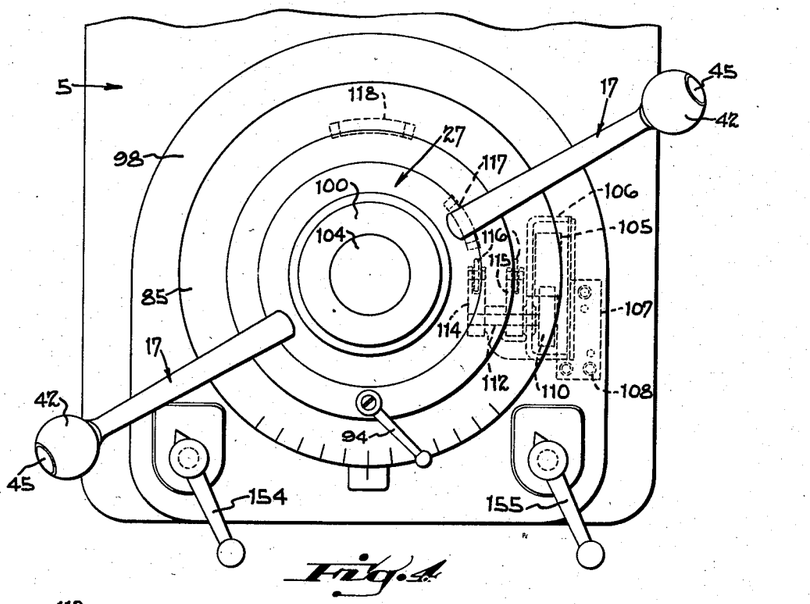
Figure 4 is a front elevation of the horn and feed dial members of the head.
Figure 7:
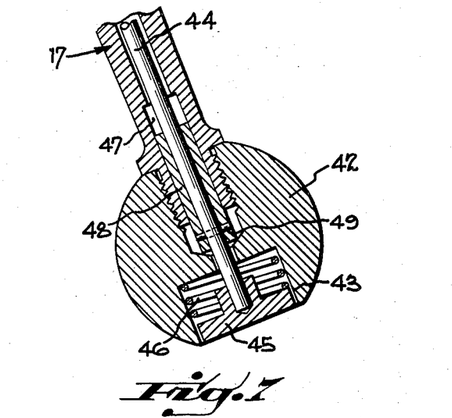
Figure 7 is an enlarged fragmentary view of the outer portion of one of the feed levers taken from Figure 2, detailing the clutch actuator.

Horns 17 are elongated members having their inner ends in threaded engagement with hub 27, the horns preferably being diametrically disposed with respect to the hub (Figure 4). At their outer ends, each of the horns is equipped with a knob or ball 42 having an axial recess 43 at its extremity, as is shown in Figure 7. Each horn 17 preferably is hollow and a rod being movably disposed therein. At its outer end, each rod 44 carries a push button 45 which resides in recess 43. The inner face of the push button bears against a compression spring 46 which is seated in the recess, and the outer face of the push button is flush with or disposed slightly beneath the outer extremity of the knob. Also, the outer end of each horn 17 is counterbored as at 47 to receive a guide bushing 48. The bushing is traversed longitudinally by the rod 44 and is pinned thereto as at 49 (Figure 7), this arrangement permits the outer end of the bushing to bear against the internal bore of the knob to limit outward movement of the rod.

At their inward extremities, the control rods 44 pass through clearance apertures in the hub 27 into a central recess 19 of the hub (Figure 2). The inner ends of the control rods at this area are guided by bushings 50 in counter bores in the horn ends.

Feed shaft 13 within hub recess 19 is provided with a counter-turned portion 51 upon which a bracket 52 of Formica or similar electrical insulation material is fastened by a nut 18. This bracket provides offset platforms 53, 53 upon which micro-switches 54 are mounted, one for each control rod 44. The switches are so positioned that the actuating buttons 55 thereof are aligned with and engageable by the endwise portions of the respective control rods 44. Switches 54 are of the normally open type and, in a manner later explained in detail functions to control energization of the magnetic clutch 16. Therefore, it will be seen that an operator grasping either horn knob, as an incident to manual adjustment of the level of the drill spindle, conveniently may depress the adjacent push button 45 in the end of the knob, thereby actuating one of the switches 54 to engage the power feed at will. Disposition of the ends of the push buttons 45 flush with or just beneath the extremities of the knobs 42 prevent inadvertent energization.

Since the hub assembly, including driven member 34, is rotatable relative to the driving member 33 of the magnetic clutch, a commutating or slip ring electrical interconnection is provided for circuit completion between the switches and the magnetic clutch coil 39 of the clutch driver 33. For this purpose, two electrically conductive slip rings 56 and 57 (Figure 3) are mounted around the shank portions of the hub 27. These rings are bedded upon electrical insulation rings 58, 58 which are split as at 59 to permit assembly, and the slip rings are spaced apart by an intermediate spacing ring 60. Actually only one of these rings is all that is required to serve the clutch control switches 54, 54, but a second is utilized in the construction shown to accommodate a limit switch for decommissioning power feed automatically as described at a later point.

Figure 3:
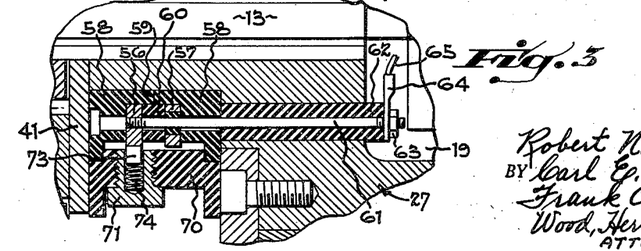
Figure 3 is a fragmentary view, on enlarged scale, of a portion of the clutch construction.

As shown in Figure 3, an electrically conductive rod 61 extends from ring 56 forwardly through an insulating bushing 62 into the recess 19 of the hub 27 where it is fastened by nut 63 to a terminal 64 of a lead 65 which is taken to one of the switches 54. By similar construction, but at a substantially diametrically opposed point, slip ring 57 is engaged by a conductive rod 66 which leads through a duplicate insulating bushing to the interior of the hub recess where it carries a terminal 67 of a lead 68 taken to the other microswitch (Figure 2). The switches 54, in turn, are connected in parallel through leads 69, 69. These electrical connections establish circuits from the switches to rings 56 and 57.

The slip rings 56 and 57, in turn, are surrounded by an insulating ring 70 which carries electrically conductive bushings 71 and 72 (Figure 2), the bushings being positioned in alignment with the respective slip rings. Each bushing is bored internally to receive a brush 73 (Figure 3) which bears upon the outer surface of the slip ring under the pressure provided by a compression spring 74 which is seated in the bushing. Circuits to the brushes are provided by connection of lead wires to the bushings 73, as explained later.

For supplying electrical energy to the magnetic winding 39 of clutch 16, the exterior portion of the driver clutch element 33 is provided with a slip ring 77 set upon insulation 78. The clutch winding is connected in a suitable manner to the slip ring 77 as is indicated diagrammatically by the lead 79, while the other side of the coil circuit is completed as shown in the electrical circuit. Slip ring 77 is served by a brush 80 supplied from a circuit lead 81. The brush is supported in a bracket 82 fastened to a boss 83 provided at the interior of the head.

Dial system

Figure 5:
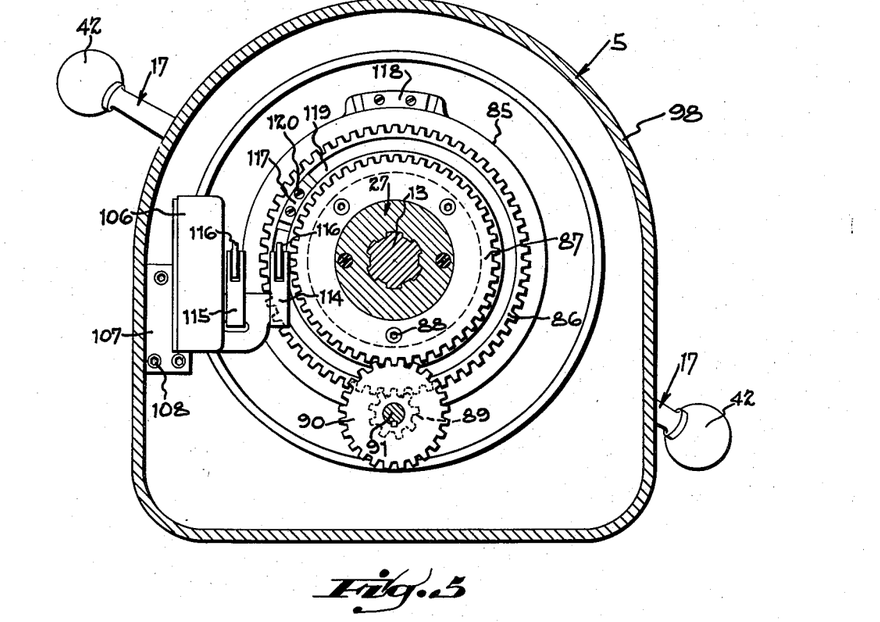
Figure 5 is a sectional view taken on the line 5—5 of Figure 2 showing the feed dial and stop devices associated therewith.

Hub 27 at its periphery rotatably supports a dial ring or feed dial 85 which is suitably graduated to denote the lineal extent of spindle feed (Figure 4). However, a reduction gear train is preferably utilized such as to provide for example, one revolution of the dial in consequence of movement of the spindle from its upper to its lower limit of travel (Figures 2 and 5). The reduction is provided by a gear 86 which is rotatably journalled on a counter-turned portion of hub 27. A second gear 87, of smaller diameter than gear 86, is fixed to hub 27 such as by fastening screws 88. A gear coupler consisting of gears 89 and 90, provides a driving connection between gears 86 and 87, gear 89 being in mesh with gear 86 and gear 90 being in mesh with gear 87. The gear couplet is fastened upon a stub shaft 91 which is rotatably supported in anti-friction bearings 92 in a bracket 93 which is fastened to the head casting by screws. Thus, it will be seen that when the hub 27 is rotated through manipulation of the horns 17, gear 87 is driven in unison therewith, thereby driving the gear 86 at a reduced ratio provided by the gear couplet 89, 90.

To provide adjustability in the setting of the dial to a zero reference mark, gear 86 is rotatable relative to the hub and dial and may be frictionally connected to the dial through a binding lever 94 having a screw portion 95 threaded into the dial. The screw portion 95 terminates in an angular face 96 which bears upon a friction pin 97 engageable at its inner end upon the hub portion of gear 86. Therefore, as the binding lever is swung from one position to another, the angular face 96 is moved inwardly or outwardly to engage or disengage the friction pin from the hub portion of gear 86. When disengaged, dial ring 85 is rotatable manually to a zero reading.

The outer periphery of the feed dial 85 is surrounded by a cover plate 98 which is suitably fastened to the front face of the head as at 99. For completing the enclosure of the mechanism, an end cap 100 is mounted over the recess opening 19 of hub 27 (Figure 2). In addition, however, to eliminate axial movement of the feed shaft 13, and to support the portion thereof which overhangs the anti-friction bearings 31, the end cap 100 is bored centrally to form a journal for an endwise, counter-turned portion 101 of the feed shaft. The outer end of the shaft includes a stop portion threaded as at 102 and the end cap is recessed to receive a nut 103 screwed upon the threaded portion of the feed shaft. The adjustment of the nut, therefore, permits all of the bearings, spacers, and other parts distributed along the length of the feed shaft to be brought into snug engagement with one another and prevents end play. A removable cover plate 104 is installed in the recess over the nut and attached by screws.

Limit switches

Figure 6:
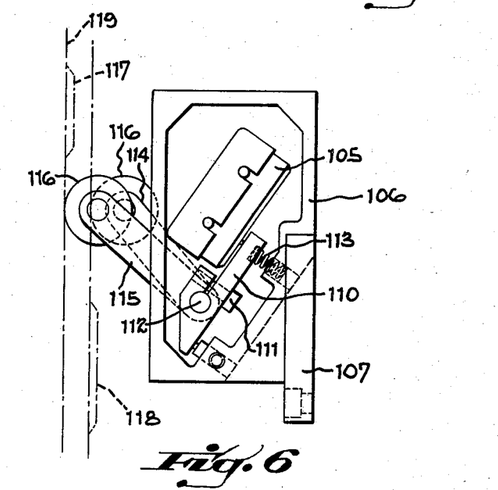
Figure 6 is a diagrammatic elevation showing the depth limit switch mechanism and control cams therefor.

At the inside of the head 5 (Figures 4, 5 and 6) a limit switch 105 is mounted within a box 106 having a foot 107 extending therefrom which is secured by screws 108. Switch 105 is of the normally closed micro-switch type; it is in circuit with the clutch winding as later described and its contactor is engageable by an arm 110 which is secured by a clamp screw 111 upon a rock shaft 112 extending through the wall of the switch box. The arm 110 is biased by a compression spring 113. Rock shaft 112 at the exterior of the box carries cam follower arms 114 and 115, each of which at its outer extremity rotatably supports a roller 116. These rollers respectively are in alignment with and adapted to be engaged by cams 117 and 118.

Cam 117 is secured in an annular groove 119 at the inside face of the gear 86 to which it is fastened by screws 120 (Fig. 5). The cam has chamfered leading ends and functions to lift the cam follower arm 114 when the same is engaged by the roller 116 thereof, whereby the rock shaft 112 is swung against the bias of spring 113, to cause switch releasing or switch opening movement of arm 110 in the switch box.

Cam 118, mounted on the inside face of dial 85, is arranged to effect the actuation of cam follower arm 115. It will be seen, therefore, that when either cam 117 or 118 engages its follower, the rock shaft will be operated to open the limit switch 105.

This arrangement permits a single limit switch to be used for automatically causing disengagement of the power feed clutch whenever the spindle reaches some predetermined point in its range of travel, such as when the spindle reaches its upper or lower limit; also for automatically disengaging power feed at some intermediate point conforming to the depth to which a hole is to be drilled or counter-bored as dictated by the adjustable setting of dial 85.

Electrical circuit

Figure 8:
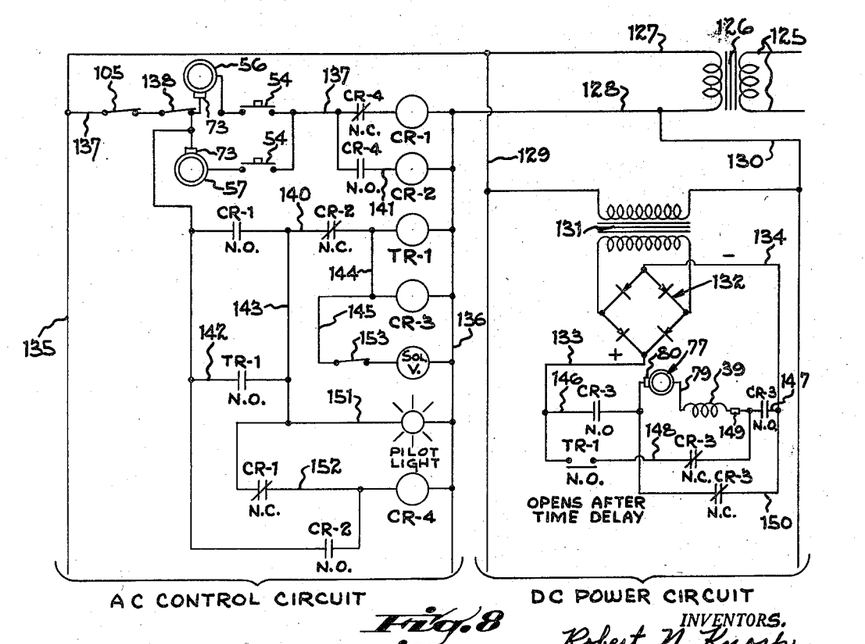
Figure 8 is a diagram showing the electrical circuit of the apparatus.

The electrical circuit shown in Figure 8 controls the operation of the magnetic clutch and the power feed of the spindle in response to the clutch control switch 105, or in response to the manually operated micro-switches 54 of the horns. The components shown in the circuit are mounted in a housing located at some point on the machine and interconnected with the limit switch and micro-switches by the slip rings and leads as described with reference to Figure 2.

Generall described, the circuit engages the magnetic clutch for power spindle feed when the spindle control switch 105 is closed (with the spindle set for a predetermined depth), the power feed being initiated by manual operation of one of the switches 54 (push buttons 45 Figure 2). When either push button 45 is depressed, the magnetic clutch engages, causing the spindle feed to continue until the depth control switch 105 is tripped to disengage the clutch in an automatic manner. On the other hand, if the operator desires to stop the spindle feed before switch 105 is tripped, then he depresses one of the push buttons 45 of the horns.

For this purpose, the circuit is arranged to engage the clutch when either manually operated button is depressed and to disengage the clutch if either button again is depressed after the feed cycle is initiated.

As described in detail later, the magnetic clutch is disengaged promptly, in response to a signal, by magnetic repulsion under surge voltage applied through a polarity reversing system. This reverse voltage is applied momentarily by a time delay relay which, when power feed is initiated, sets up an inactive circuit for supplying the reverse polarity voltage to the clutch winding disengagement. The reversing circuit is inactive until the time delay relay is triggered at the end of the cycle, or by one of the manual switches 54; at this point, the reversing circuit applies the reverse surge voltage to the clutch winding.

Described in detail, the electrical circuit shown in Figure 8 comprises a D.C. power circuit for actuating the clutch winding and an A.C. control circuit. The control circuit includes the necessary relays and contacts for regulating the operation of the clutch through its cycle in response to the clutch control switch and manual push buttons of the horn. The two sections of the electrical circuit are bracketed as indicated on the drawing.

The electrical energy is supplied to the circuit from the A.C. power leads 125—125, which may represent the 220 volt service lines which also power the machine tool. The leads are connected to the primary winding of a transformer 126, having secondary leads 127 and 128 connected to the D.C. power and A.C. control circuits. The D.C. power circuit for the clutch winding is connected to leads 127 and 128 by way of leads 129 and 130 which extend to the primary winding of a power transformer 131. The secondary winding of power transformer 131 is connected across the input terminals of a rectifier, indicated generally at 132. The output terminals 133 and 134 of the rectifier are connected to the winding 39 of the feed clutch by way of a reversing circuit including a time delay contact as explained later. Power transformer 131 steps down the voltage available in this portion of the circuit from say 110 A.C. to 24 volts which is converted by the rectifier to direct current for operation of magnetic clutch.

The control elements of the control circuit comprise relays CR–1, CR–2, CR–3, CR–4, and the time delay relay TR–1. The relays of the A.C. control circuit are energized by the two main supply lines 135 and 136, which are connected to the output lines 127 and 128 of transformer 126. For simplicity, the circuits of the relays are shown directly across the two main supply lines 135 and 136. It will be understood that the contacts and relays conform to the relay designation of common use and that the contacts are normally open or closed as indicated in the diagram. The relays in their contacts are not shown physically connected, each relay and its contacts having corresponding designations; for example, the contacts actuated by relay CR–1 are indicated as CR–1, contacts of CR–2 are indicated as CR–2, etc.

When the operator has adjusted the spindle for a desired depth, or if it is to be fed manually, he depresses one of the push buttons 45 of the horns 17, so as to close one of the manually operated switches 54. As shown in the control section of the diagram, relay CR–1 is energized through manual switches 54 by way of main supply line 135, line 137, through the closed spindle control switch 105, and through the slip rings 56, 57 and brushes 73, previously noted with reference to Figure 2.

It will be noted that line 137 includes a normally closed final limit switch 138 in series with spindle control switch 105. The final limit switch 138 is mounted in the drill head and is arranged to be tripped open when the spindle reaches its final limit of travel, its purpose being to prevent over-travel of the spindle in the event of some failure to the control system. This arrangement is well known in the art and the final limit switch has been omitted from the detailed drawings.

It will be noted that the manually operated control switches 54 (actuated by buttons 45 of the horns) are connected in parallel with one another as at 141, such that the closing of either switch energizes relay CR–1 at the start of the cycle. Line 141 represents the leads 65, 68 and 69 of Figure 2.

As soon as one of the switches 54 is closed, a circuit is completed from line 137, through normally closed contact CR–4, thus completing a circuit through the relay CR–1 to line 128. Upon closing, relay CR–1 closes contact CR–1, line 140 and energizes time relay TR–1 through the normally closed contact CR–2 of relay CR–2, CR–2 being deenergized at the beginning of the feed cycle. When relay TR–1 is energized, it closes normally open contact TR–1 in line 142 and 143, contact TR–1 being a holding contact which keeps relay TR–1 energized during the feed cycle.

It will be noted at this point that CR–1 is energized only while manually operated switch 54 is closed; it drops out as manual switch 54 opens. The holding circuit of contact TR–1 allows the push button 45 to be released after starting the cycle. It will also be observed that normally open CR–1 contact in line 140 opens when relay CR–1 drops out, the holding circuit of TR–1 being by way of line 142 and 143 through contacts TR–1 and CR–2.

When relay TR–1 is energized, relay CR–3 is energized by way of branch line 144 as is the solenoid valve in line 145, the function of which is explained later. When relay CR–3 is energized by relay TR–1, it closes its normally open contacts CR–3 in lines 146 and 147 of the D.C. power supply circuit, thus energizing clutch coil 39 and causing downward spindle feed.

The circuit to one end of clutch winding 39 is completed by way of slip ring 77, brush 80 and lead 79, previously described with reference to Figure 2 and as indicated in the diagram. The circuit is completed from the opposite end of the winding by grounding the winding internally to the machine as indicated diagrammatically at 149 in the circuit diagram.

Relay CR–3 also includes the two normally closed contacts CR–3 in the reversing lines 148 and 150; consequently, the normally closed contacts are opened as soon as relay CR–3 is energized. The time delay relay TR–1 includes a normally open timer contact TR–1 in D.C. line 148 of the reversing circuit. This contact closes and sets up the circuit for disengaging the clutch by applying the reverse surge current at the end of the cycle. Since the normally closed CR–3 contacts of reversing lines 148 and 150 are now open, the closing of timer contact TR–1 has no effect at this time.

During downward feed of the spindle under control of relay TR–1, a circuit is also completed by way of line 143 and line 151 to the pilot light indicating that the spindle is under power feed. As noted earlier, the operation of the push buttons 45 of the horns during the feeding cycle will stop the power feed.

For this purpose, an electrical interlock sets up a circuit which prevents relay CR–1 from being energized; instead a circuit is established to energize relay CR–2 if either of the manually operated switches 54 is closed manually during the feeding cycle. Relay CR–1 includes a normally closed interlock contact CR–1 in line 152 which completed the circuit to relay CR–4. This contact is held open only while the manually operated switch 54 is closed at the start of the feed cycle; it remains closed thereafter. Therefore, contact CR–4 of line 137 to relay CR–1 is open during the cycle (CR–4 being energized) while the normally open CR–4 contact in line 141 to relay CR–2 is closed. Accordingly, should either manual of the switches 54 be closed during the feed cycle, relay CR–2 will be energized to stop the feed; if neither switch 54 is closed, then the spindle will continue feeding until the spindle control switch 105 is opened at preselected spindle position.

As soon as spindle control switch 105 opens at the selected spindle feed limit (or final limit switch 138) the holding circuit, lines 142, 143 and holding contact TR–1 will be deenergized, thus causing the time relay TR–1 to open. At this time, relay CR–3 (also the solenoid valve and pilot light) will also be deenergized, being connected in parallel with relay TR–1. Upon dropping out, CR–3 opens its normally open contacts CR–3 in the D.C. supply lines 146 and 147 and closes its normally closed contacts CR–3 in the reversing lines 148 and 150.

At this point, the timing contact TR–1 of line 148 remains closed momentarily; therefore, as soon as relay CR–3 is deenergized, the circuit of the opposite polarity is applied to the clutch coil by way of reversing lines 148 and 150, then the timing contact TR–1 opens. The clutch winding therefore, under a momentary surge voltage, is disengaged, then the winding is deenergized. This reversal is manifested as a relative compulsion of the clutch driven member 34, and the clutch element is displaced from the driving element 33, providing very prompt disengagement of the power feed. The time relay TR–1 is so arranged that the surge polarity prevails, for instance for 0.2 of a second. The relay TR–1 may be of the adjustable type to provide regulation of the surge duration which is required to accommodate a given assembly.

Should the operator open one of the manual switches 54 during the feed cycle, relay CR–2 is energized, the CR–4 contact to CR–2, (line 141) being closed and its companion contact CR–4 to relay CR–1 (line 137) being open. Upon being energized, relay CR–2 opens its normally closed contact CR–2 (line 140) to deenergize the time delay relay TR–1 and relay CR–3. CR–3 opens its contacts in D.C. lines 146 and 147 and closes its surge contacts in the D.C. reversing lines 148 and 150. The timing contact TR–1 in D.C. line 148 remains temporarily closed, as described above to apply the surge voltage through the reversing lines to disengage the clutch. The timing contact then opens to deenergize the clutch winding.

After the feed cycle has been terminated either by the spindle control switch 105 or manual switches 54, the circuit is re-established to relay CR–1 by way of the normally closed CR–4 contact to CR–1 (line 137). When the cycle is again initiated, therefore, relay CR–1 establishes the circuit by way of its normally open contact in line 140 to the time delay relay TR–1 as described earlier, to again engage the clutch.

From the circuit just described, it will be seen that actuation of either push button 45, at the convenience of the operator, is effective initially to engage the feed clutch and that the next successive actuation of either button is effective to disengage the feed clutch. Because reversal of polarity is very prompt and rapid in the clutch field, clutch disengagement and feed depth may be controlled accurately. In fact, the residual magnetism which commonly accompanies use of a magnetic clutch previously has defeated satisfactory usage of such devices where prompt declutching and avoidance of over-drag are requisite, but the features of the invention which have been described eliminate these problems and permit successful clutch operation in solving the problem of eliminating arm movement as an incident to feed clutch engagement in a radial drill.

In conjunction with the control elements which have been described, the machine may also include means for clamping the head upon the arm and the column on the stump, which clamps may be of the solenoid-controlled hydraulic type or of the solenoid-actuated mechanical type. In the circuit illustrated, an interlock switch 153 is interposed in line 145 leading to the solenoid operated valve. This switch may be manually operated or it may be interlocked with certain machine elements which control feeding of the arm and head. In either event, the switch opens or closes the circuit to the solenoid valve, the switch being opened when it is not desired to effect clamping automatically in consequence of feed clutch engagement. The solenoid valve may control a hydraulic circuit of the machine through which hydraulic fluid under pressure may be admitted to the head clamp, the column clamp, or both. Since such hydraulic circuits are well known to those skilled in this art, they are not shown in detail. However, in the operation of the electrical circuit described herein, it will be noted that the solenoid valve is energized, at the same time that relay TR–1 and CR–3 are energized, whereby unless switch 153 is open, the clamping elements will be actuated automatically. Since power feeding is almost always commenced prior to engagement of the cutting tool with the work, the machine parts will be held in rigid relationship to one another by the time the cutting tool actually engages the work. The clamping elements may either be released by manually operable release valves 154 and 155 as shown in Figure 4, or the release may be automatic by operation of the solenoid valve, depending upon the selective position of the release valves.

Having described our invention, we claim:

1. In a radial drill having a spindle which is rotatably and axially movable, a rotatable feed shaft coupled to the spindle for effecting axial movement thereof upon rotation of the feed shaft, power means for rotating said spindle, and power means for rotating said feed shaft, the improvement which comprises an electro-magnetic clutch having a driven element coupled to said feed shaft, and a driver element coupled with said feed shaft power means, a hub coupled with said feed shaft, at least one horn extending from said hub for effecting manual operation of said feed shaft independently of said clutch and feed shaft power means, electric means including a switch for controlling energization of said electro-magnetic clutch to effect clutch engagement and disengagement, and a push button associated with said manually operable horn for actuating said switch, said horn and push button thereby providing axial feeding movement of the spindle either manually or by power.

2. In a radial drill having a column, an arm rotatable about the axis of said column, a head movable along said arm, a rotatable and axially movable spindle supported by said head, power means connected to the spindle for rotating said spindle, said power feed means including an electro-magnetic clutch connected to the spindle for axially feeding said spindle, manually operable feed means connected to the spindle for axially feeding said spindle independently of said clutch and power feed means, and a clutch control device carried by said manually operable feed means for engaging and disengaging said electro-magnetic clutch, said manually operable feed means and clutch control device being movable in a common plane which is generally parallel with the axis of the column.

3. In a radial drill having a column, an arm rotatable about the axis of said column, a head movable along said arm, a rotatable and axially movable spindle supported by said head, power means connected to the spindle for rotating said spindle, power feed means including an electrically operated clutch connected to the spindle for axially feeding said spindle, manually operable feed means connected to the spindle for axially feeding said spindle independently of said clutch and power feed means, and an electrical clutch control device carried by said manually operable feed means and operatively connected to the electrically operated clutch, whereby axial feeding movement is imparted to the spindle either manually or by power by selective actuation of the manually operable feed means or the electrical clutch control device carried thereby, said manually operable feed means and electrical clutch control device being movable in a common plane which is generally parallel with the axis of the column.

4. In a radial drill having a column, an arm rotatable about the axis of said column, a head movable along said arm, a rotatable and axially movable spindle supported by said head, power means connected to the spindle for rotating said spindle, power feed means including an electro-magnetic clutch for axially feeding said spindle, manually operable feed means connected to the spindle for axially feeding said spindle independently of said ctluch, a manually movable clutch control device carried by said manually operable means, a source of electrical energy, and switch devices interconnecting the source of electrical energy and clutch, said clutch control device being connected to said switch devices for actuating the same, said switch devices engaging and disengaging the clutch alternately in response to each movement of the said clutch control device.

5. In a radial drill having a column, an arm rotatable about the axis of said column, a head movable along said arm, a rotatable and axially movable spindle supported by said head, power means connected to the spindle for rotating said spindle, power feed means including an electro-magnetic clutch connected to the spindle for axially feeding said spindle, manually operable feed means connected to the spindle for axially feeding said spindle independently of said clutch, a clutch control device carried by said manually operable feed means, a source of electrical energy, polarity reversing switches interconnecting the source of electrical energy and clutch, said clutch control devices being interconnected with said switches for energizing the clutch in positive and negative polarity, said clutch being responsive to the application of positive and negative polarity to provide engagement and disengagement in response to the polarity of the electrical energy applied thereto.

6. A feed mechanism for a radial drill having a rotatable and axially movable spindle, said feed mechanism comprising a rotatable feed shaft coupled with said spindle to effect axial feeding movement of the same upon rotation of said feed shaft, power feed means connected to the feed shaft for rotating said feed shaft, said power feed means including an electro-magnetic clutch having engageable elements coupled respectively with said power feed means and with said feed shaft for establishing a driving connection therebetween, said feed shaft having a hub in driving connection therewith for rotating the feed shaft, said hub having at least one manually operable horn extending therefrom, the said hub having a recess therein, a clutch control switch in circuit controlling connection with said electro-magnetic clutch and disposed within said hub, and a manually operable actuator carried by said horn and connected to said switch for operating said switch to effect energization and de-energization of said clutch.

7. A feed mechanism for a radial drill having a rotatable and axially movable spindle, said feed mechanism comprising a rotatable feed shaft coupled with said spindle to effect axial feeding movement of the same upon rotation of said feed shaft, power feed means connected to the feed shaft rotating said feed shaft, said power means including an electro-magnetic clutch having engageable elements coupled respectively with said power feed means and with said feed shaft, said feed shaft having a hub in driving connection therewith for rotating the shaft manually, said hub having at least one manually operable horn extending therefrom, the said hub having a recess therein, a clutch control switch disposed within said hub, a source of electrical energy connected to the electro-magnetic clutch, said clutch control switch interconnected with said source of electrical energy and applying electrical energy to the clutch for engaging the same upon operation of the switch, and a manually operable actuator carried by said horn and connected to said switch for operating said switch, thereby to engage the clutch for power feeding of the spindle.

8. A feed mechanism for a radial drill having a rotatable and axially movable spindle, said feed mechanism comprising a rotatable feed shaft coupled with said spindle to effect axial feeding movement of the same upon rotation of said feed shaft, power feed means connected to the feed shaft for rotating said feed shaft, said power feed means including an electro-magnetic clutch having engageable elements coupled respectively with said power feed means and with said feed shaft for establishing a driving connection therebetween, said feed shaft having a hub in driving connection therewith for rotating the feed shaft manually, said hub having at least one manually operable horn extending therefrom, the said hub having a recess therein, a clutch control switch disposed within said hub, a source of electrical energy, including reversing switches interconnecting the same with the electro-magnetic clutch, means interconnecting the said clutch control switch with said reversing switches for actuating the same, and a manually operable actuator carried by said horn and connected to the clutch control switch for operating said switch, thereby to actuate the reversing switches, said reversing switches engaging and disengaging said clutch in response to operation of said actuator.

9. A mechanism for feeding an axially movable rotatable spindle of a radial drill, which mechanism comprises a rotatable feed shaft coupled with said rotatable spindle for effecting axial feeding movement thereto upon rotation of said feed shaft, power feed means, a normally disengaged electro-magnetic clutch having engageable elements coupled respectively with said power feed means and with said feed shaft, said engageable elements being movable toward and from one another axially of said feed shaft in clutch engaging and disengaging positions, said feed shaft having a hub coupled thereto, a pair of horns projecting in generally radial directions from said hub whereby said feed shaft may be rotated manually by swinging either horn through a plane or rotation, at least one of said horns having a clutch control element associated therewith and being movable in a direction generally in parallelism with the plane of rotation of the horns, and means interconnecting said electro-magnetic clutch with said clutch control element, whereby said clutch may be controlled through movement of said clutch control element in a direction generally parallel with the plane of rotation of said horns.

10. A mechanism for feeding an axially movable rotatable spindle of a radial drill, which mechanism comprises a rotatable feed shaft coupled with said rotatable spindle for effecting axial feeding movement thereto upon rotation of said feed shaft, a power feed means, a normally disengaged clutch having electrically operated engageable elements coupled respectively with said power feed means and with said feed shaft, said engageable elements being movable toward and from one another axially of said feed shaft in clutch engaging and disengaging positions, said feed shaft having a hub coupled thereto, a pair of horns projecting in generally radial direction from said hub whereby said feed shaft may be rotated manually by swinging either horn through a plane of rotation, at least one of said horns having an electrical clutch control element associated therewith, said electrical control element being movable in a direction generally in parallelism with the plane of rotation of the horns, and electrical means interconnecting at least one of said engageable clutch elements with said clutch control element, whereby said spindle is fed axially by manual swinging of said horns or by power upon movement of the electrical clutch control element in a direction generally parallel with the plane of rotation of said horns.

11. A feed mechanism for a rotatable axially movable spindle of a radial drill which mechanism comprises, a feed shaft coupled with said spindle for effecting axial feed movement to the same upon rotation of said feed shaft, power feed means, a clutch comprising cooperable members, coupling means connecting one clutch member to said power feed means and the other clutch member to said feed shaft, at least one of said coupling means formed of non-magnetic material, one of said clutch members having an electro-magnetic winding, the other of said members being magnetically responsive thereto, a source of direct current, a clutch control switch for controlling interconnection of said electro-magnetic means with said source of current, in said given polarity, and means interconnecting said electric circuit and electro-magnetic winding for momentarily applying said direct current in reverse polarity to said electro-magnetic winding in consequence of actuation of said switch, thereby engaging said cooperable clutch members upon a first actuation of the clutch control switch and disengaging the clutch upon a second actuation thereof.

12. A feed mechanism for a rotatable axially movable spindle of a radial drill which mechanism comprises, a feed shaft coupled with said spindle for imparting axial feed movement to the same upon rotation of said feed shaft, power feed means, an electro-magnetic clutch comprising cooperable members, one being coupled to said power feed means, the other being coupled to said feed shaft, magnetic shielding means interposed between the feed shaft and one of said clutch members, one of said members having an electro-magnetic winding, the other of said members being magnetically responsive thereto, a source of direct current for energizing said electro-magnetic winding in a given polarity to energize the clutch, reversing switch means in said source of direct current for momentarily applying said current in reverse polarity to said electro-magnetic winding, a shiftable clutch control switch connected to said reversing switch means, said control switch causing said reversing switch means to apply the direct current in said given polarity upon a first actuation of the control switch and to apply the current in reverse polarity upon a second actuation thereof, thereby engaging and disengaging the clutch.

13. A feed mechanism for a rotatable axially movable spindle of a radial drill which mechanism comprises, a feed shaft coupled with said spindle for imparting axial feed movement of the same upon rotation of said feed shaft, said shaft formed of magnetic material, power feed means, a clutch comprising cooperable members, a coupling member formed of non-magnetic material, said coupling members connecting one of said cooperable clutch members to said feed shaft, the other of said cooperable members being coupled to said power feed means, one of said members having an electro-magnetic winding the other of said members being magnetically responsive thereto, a source of direct current, a shiftable clutch control switch normally positioned to interconnect said electro-magnetic means with said source of current in a given polarity for engaging the clutch by magnetic attraction, said non-magnetic coupling member providing magnetic shielding of said feed shaft, a switch tripping element in driving connection with the spindle, said element engageable with said clutch control switch for shifting the same from said normal position in response to a predetermined feeding motion of the spindle, and means for momentary applying D.C. current of reverse polarity to said electro-magnetic winding in consequence of actuation of said switch from said normal position for disengaging said clutch by magnetic repulsion at said predetermined spindle position.

14. In a radial drill having a column, an arm rotatable about the axis of said column, a rotatable and axially movable spindle supported by said head, power means connected to the spindle for rotating said spindle, power feed means including an electro-magnetic clutch connected to the spindle for axially feeding said spindle, manually operable feed means connected to the spindle for axially feeding said spindle independently of said clutch, a manually operated switch carried by said manually operable feed means, a spindle actuated switch, trip means connected to the power feed means engageable with said spindle actuated switch, the spindle actuated switch normally residing in a given position and being shifted to a second position upon engagement by said trip means, said trip means engaging the switch at a predetermined degree of axial spindle feed motion, a source of electrical energy, polarity reversing switches interconnecting the source of electrical energy and clutch, said manually operated switch and spindle actuated switch being interconnected with said reversing switches for energizing the clutch in positive and negative polarity, said clutch being responsive to the application of positive and negative polarity to provide engagement and disengagement in response to the polarity of the electrical energy applied thereto, said manually operated switch shifting said reversing switches to engage and disengage the clutch, said spindle actuated switch shifting the reversing switches to disengage the clutch upon being shifted to said second position by the trip means.

15. A feed mechanism for a radial drill having a rotatable axially movable spindle, which mechanism comprises a feed shaft coupled with said spindle for axially moving the same upon rotation of said feed shaft, rotatable power means, a clutch having elements coupled respectively with said power means and with said feed shaft, an electro-magnetic winding through which said clutch elements may be engaged magnetically with one another, a source of direct current for energizing said winding, an electric control circuit, said control circuit including manual switch means for energizing said winding and engaging the clutch elements, and a time delay relay in circuit connection with said winding and said source of direct current, said relay momentarily applying to said winding a surge of current having a polarity opposite to the clutch engaging polarity in response to actuation of the manual switch means to clutch disengaging position, said winding arranged to disengage the clutch elements in response to said surge of direct current.

16. A feed mechanism for a radial drill having a rotatable axially movable spindle, which mechanism comprises a feed shaft coupled with said spindle for axially moving the same upon rotation of said feed shaft, rotatable power means, a clutch having elements coupled respectively with said power means, and with said feed shaft, an electro-magnetic winding through which said clutch elements may be engaged magnetically with one another, a source of direct current for energizing said winding, an electric control circuit, manually operable switches interconnected in the control circuit and including means alternately energizing and deenergizing said winding upon each actuation thereof, a time delay relay in circuit connection with said winding and said source of direct current, said relay momentarily applying to said winding a surge of direct current having a polarity opposite to the polarity which engages the clutch, and means in the control circuit actuating said relay in consequence of actuation of said manually operable switches in clutch disengaging sequence, thereby to cause application of said surge of current of opposite polarity, said winding arranged to disengage said clutch elements magnetically in response to said surge of current.

17. A feed mechanism for a radial drill having a rotatable axially movable spindle, said feed mechanism comprising, a rotatable feed shaft coupled with said spindle for effecting axial movement thereof upon rotation of said feed shaft, a hub coupled with said feed shaft and having hollow horns projecting radially therefrom, whereby said feed shaft may be rotated manually by grasping one of said horns, power means including an electro-magnetic clutch for rotating said feed shaft independently of said horns, manually operated clutch control members movably extending through the hollow portion of said horns, a source of direct current, reverse polarity switches connecting the source of direct current to the clutch, means interconnecting the manually operated members of the horns to the said reversing switches for actuating the same, thereby to apply the direct current in positive and negative polarity to the electro-magnetic clutch, said clutch arranged to engage in response to a given current polarity and to disengage under magnetic repulsion in response to an opposite current polarity, and spindle actuated means interconnected with said reversing switches, said spindle actuated means in driving connection with the spindle and shifting said reversing switches to a position applying said opposite current polarity to the clutch at a limit of axial spindle movement, thereby to disengage said clutch under magnetic repulsion at said limit.

18. A feed mechanism for a radial drill having a rotatable axially movable spindle, said feed mechanism comprising a feed shaft coupled with said spindle for axially moving the same upon rotation of said feed shaft, rotatable power means including an electro-magnetic clutch having clutch elements coupled respectively to said power feed means and to said feed shaft, said clutch engaging and disengaging in response to direct current applied thereto in positive and negative polarity, said feed shaft having a hub connected thereto, horns projecting generally in radial direction from said hub for effecting manual rotation of said feed shaft by grasping one of said horns when said clutch is disengaged, said hub including slip ring means rotatable with said hub and insulated therefrom, said slip ring means electrically connected to the electro-magnetic clutch, a source of direct current including means for reversing the polarity thereof, and brushes in electrical contact with said slip ring means and connected to said source of direct current and rotatably interconnecting said electro-magnetic clutch to said current for engaging and disengaging the clutch.

19. A feed mechanism for a radial drill having a rotatable axially movable spindle, said feed mechanism comprising, a feed shaft coupled with said spindle for axially moving the same upon rotation of said feed shaft, rotatable power means, a clutch having clutch elements respectively coupled to said power feed means and to said feed shaft, said clutch having an electro-magnetic winding for effecting engagement of said clutch elements, said feed shaft having a hub connected thereto, horns projecting generally in radial direction from said hub for effecting manual rotation of said feed shaft by grasping one of said horns, when said clutch is disengaged, said hub having a central cavity, switch means mounted in said cavity, clutch control means associated with said horns for actuating said switch means, slip ring means rotatable with said hub and insulated therefrom, and brushes cooperable with said slip ring means and rotatably interconnecting said switch means electrically in circuit controlling relation to said electro-magnetic winding for engaging or disengaging the clutch, whereby said spindle selectively is fed manually by rotation of said horns or by power upon actuation of each switch means by the clutch control means of the horns.

References Cited in the file of this patent

UNITED STATES PATENTS 1,759,543    Cole _________________ May 20, 1930